United States Patent [19]

Lakshmanan et al.

[11] 4,072,808

[45] Feb. 7, 1978

[54] PROCESS FOR PREPARING ELASTOMERS FOR PRESSURE-SENSITIVE ADHESIVE APPLICATION

[75] Inventors: Pallavoor R. Lakshmanan, Houston, Tex.; Harold E. Swift, Gibsonia; Ching Yong Wu, Pittsburgh, both of Pa.

[73] Assignee: Gulf Research & Development Company, Pittsburgh, Pa.

[21] Appl. No.: 755,161

[22] Filed: Dec. 29, 1976

[51] Int. Cl.$^2$ .................. C08F 4/70; C08F 240/00
[52] U.S. Cl. ........................... 526/76; 526/77; 526/136; 526/141; 526/290; 526/337
[58] Field of Search ............ 526/76, 77, 136, 141, 526/290, 337

[56] References Cited

U.S. PATENT DOCUMENTS

| 2,753,325 | 7/1956 | Banes et al. | 526/76 |
| 3,565,875 | 2/1971 | Bozik et al. | 526/141 |
| 3,678,022 | 7/1972 | Bozik et al. | 526/141 |
| 3,817,953 | 6/1974 | Younger | 526/290 |
| 3,855,187 | 12/1974 | Winkler et al. | 526/76 |
| 3,880,820 | 4/1975 | Sato | 526/76 |
| 3,905,948 | 9/1975 | Vargiu et al. | 526/290 |

FOREIGN PATENT DOCUMENTS

| 11,814 | 4/1972 | Japan | 526/141 |

*Primary Examiner*—Alan Holler

[57] ABSTRACT

A process for producing an elastomer comprising selected copolymerized $C_5$-hydrocarbons from a hydrocarbon mixture containing $C_5$-monoolefinic hydrocarbons, $C_5$-diolefinic hydrocarbons (cyclic and acyclic) $C_5$-paraffins, $C_6$-aliphatics and benzene which comprises separating the $C_5$-hydrocarbons from the mixture and copolymerizing a selected portion of the resulting $C_5$-hydrocarbon mixture in the presence of a catalyst system to form an elastomer. The elastomers produced are suitable for use in adhesive compositions in general but particularly useful as a component in pressure sensitive adhesive compositions.

18 Claims, No Drawings

PROCESS FOR PREPARING ELASTOMERS FOR PRESSURE-SENSITIVE ADHESIVE APPLICATION

BACKGROUND OF THE INVENTION

1. Field of the Invention

This invention relates to elastomers synthesized from crude $C_5$-hydrocarbons, preferably crude $C_5$-hydrocarbon mixtures which are by-products in the production of ethylene. A selected portion of the crude $C_5$-hydrocarbons are copolymerized in the presence of a catalyst system to prepare an elastomer having the requisite properties to produce a pressure sensitive adhesive when added to a natural or synthetic tackifier.

In recent years many petrochemical companies have become increasingly interested in the utilization of by-products from petrochemical operations, for example, ethylene plants because of the increased availability and lower costs of these hydrocarbons as compared with their polymer grade counterparts. It has now been discovered that an elastomer synthesized from crude $C_5$-hydrocarbons, when used in combination with natural or synthetic tackifiers, is particularly suited for use as pressure-sensitive adhesives. This is very encouraging in view of existing natural resin shortages and the fact that the adhesives industry is placing increased emphasis on adhesives containing tackifiers of synthetic origin. The elastomers as defined herein have improved characteristics such as tack and peel strength when compounded with tackifiers to provide the required pressure-sensitive adhesive properties. The concurrently filed application of Lakshmanan et al., entitled "Pressure-Sensitive Adhesive Composition," Ser. No. 755,160 filed Dec. 29, 1976, describes suitable applications and adhesive compositions containing the elastomers herein, the disclosure of which is incorporated herein by reference.

2. Description of the Prior Art

The catalytic polymerization of $C_5$-hydrocarbons to form a resinous compound is known. For example, U.S. Pat. No. 3,793,261 issued to Katayama et al., on Feb. 19, 1974, entitled "Process for Preparing Petroleum Resin", discloses a process which is described as suitable for preparing petroleum resins having improved tackiness in rubber applications. In particular, the starting material for the resinous product comprises a by-product fraction in petroleum refining composed primarily of unsaturated hydrocarbons containing 5 carbon atoms. Included among the hydrocarbon by-product are 1-pentene, 2-pentene, isoprene, 1,3-pentadiene, cyclopentadiene and the like. In some cases these hydrocarbons have been obtained from cracked naphthas, as for example, in U.S. Pat. No. 2,719,853 and 2,773,838 to Reid et al..

Another process relating to the separation of $C_5$-hydrocarbons distilled from a cracked petroleum fraction and use of the resulting product is disclosed in U.S. Pat. No. 3,865,797 issued to Joy, on Feb. 11, 1975, entitled "Process for the Production of Petroleum Resins of Varying Softening Points". The reference teaches a petroleum resin feedstock which comprises $C_5$-hydrocarbons distilled from a cracked petroleum fraction in combination with a butadiene raffinate consisting of isobutene, 1-butene, 2-butene and butanes.

As can be determined from the above, there have been many processes and applications directed to the use of $C_5$-hydrocarbons derived from a cracked petroleum fraction. There is, however, an ongoing search for new and different uses for this petroleum product which is usually described as a by-product in the production of petroleum compositions.

SUMMARY OF THE INVENTION

The present invention encompasses a process for preparing an elastomer comprising copolymerized $C_5$-hydrocarbons prepared from a hydrocarbon mixture containing $C_5$-monoolefinic hydrocarbons, $C_5$-diolefinic hydrocarbons (cyclic and acyclic) including cyclopentadiene, $C_5$-paraffins, $C_6$-paraffins and benzene which comprises (A) heat-soaking said hydrocarbon mixture at a temperature sufficient to dimerize cyclopentadiene; (B) separating the resulting hydrocarbon mixture from the cyclopentadiene dimer by distillation; (C) copolymerizing the resulting hydrocarbon mixture in the presence of a catalyst system to form an elastomer. The elastomers produced are suitable for use in combination with natural and synthetic tackifiers and optional components such as solvents and anti-oxidants to provide pressure-sensitive adhesive compositions.

DETAILED DESCRIPTION OF INVENTION

The elastomer as described herein is prepared from crude $C_5$-hydrocarbon fractions, particularly those obtained from cracked naphthas, as for example, in U.S. Pat. Nos. 2,719,853 and 2,773,838 to Reid et al. Naphtha is a volatile liquid hydrocarbon mixture produced by the fractional distillation of petroleum in the boiling range of from about 80.6° F (27° C) to about 500° F (260° C) which comprises acyclic and cyclic paraffins and olefins and aromatic hydrocarbons.

In a preferred mode, the elastomer herein is prepared from crude $C_5$-hydrocarbons which are by-products obtained from a feed stream comprising a hydrocarbon mixture in the production of ethylene. This hydrocarbon mixture contains $C_5$-monoolefinic hydrocarbons, $C_5$-diolefinic hydrocarbons (cyclic and acyclic), $C_5$-paraffins, a minor amount of $C_6$-aliphatics and benzene.

$C_5$-hydrocarbon mixtures suitable for use herein are preferably obtained from a feed stream comprising a mixture of hydrocarbons having the composition defined in Table I below.

Table I

| Component | Weight Percent | |
|---|---|---|
| | Broad Range | Preferred Range |
| $C_5$-monoolefinic hydrocarbons | 5 to 50 | 10 to 30 |
| $C_5$-diolefinic hydrocarbons | 5 to 50 | 10 to 30 |
| $C_5$-paraffins | 5 to 75 | 20 to 40 |
| $C_6$-aliphatics | 5 to 75 | 5 to 40 |
| Benzene | 5 to 75 | 10 to 50 |

EXAMPLES I TO III

A more detailed study was conducted to determine the $C_5$ and $C_6$-hydrocarbon content obtained from the cracking of naphtha in the production of ethylene. The $C_5$-$C_6$ hydrocarbon mixture was fractionally distilled at 1 atmosphere of pressure using a Podbielniak Hyper-Cal apparatus. The over-head distillate at 115° F (46° C) was collected.

An analysis was conducted using a Varian model 2800 Gas Liquid Chromatograph containing a column which was ¼ inch in diameter and 120 inches in length. The column was packed with Celite and the chromatograph was programed to increase 7.2° F (4° C) every minute from 77° F (25° C) to 302° F (150° C).

Table II below illustrates the composition of $C_5$ and $C_6$-hydrocarbon fractions obtained from a commercial ethylene plant and serves as examples of a typical feed stream.

Table II

GAS CHROMATOGRAPHIC ANALYSIS OF CRUDE $C_5$-$C_6$ HYDROCARBON MIXTURE

| Example | I | II | III |
|---|---|---|---|
| n-Pentane | 5.67 | 3.76 | 1.90 |
| Pentenes | 10.34 | 8.91 | 7.41 |
| Isoprene | 12.02 | 11.96 | 10.71 |
| 3-Methyl-1-Butyne | 0.10 | 7.45 | 0.11 |
| trans 1, 3-Pentadiene | 3.01 | 0.02 | 3.67 |
| cis 1,3-Pentadiene | 1.73 | 3.96 | 1.97 |
| 2-Butyne | 0.79 | 1.90 | 0.66 |
| Cyclopentadiene | 5.86 | 0.62 | 7.66 |
| 2-Methyl-1-Butene-3-yne | 0.04 | 0.03 | 0.08 |
| $C_6$-Hydrocarbons | 60.24 | 61.90 | 65.82 |

Isoprene and piperylene (trans 1,3-pentadiene and cis 1,3-pentadiene) and other minor components in the $C_5$-$C_6$ hydrocarbon mixture are substantially separated from the undesirable components, namely $C_6$-hydrocarbons, cyclopentadiene, dicyclopentadiene, benzene and dimers of isoprene and piperylene in an autoclave under nitrogen atmosphere by heat-soaking the hydrocarbon mixture under conditions suitable for dimerizing cyclopentadiene, for example, at a temperature of about 122° F (50° C) to about 570° F (300° C), preferably about 230° F (110° C) to about 300° F (150° C), and a pressure of about 40 to about 1000 pounds per square inch gauge (about 3 to about 70 kilogram per square centimeter), preferably about 200 to about 400 pounds per square inch gauge (about 14 to about 28 kilograms per square centimeter), for about 0.1 to about 10 hours, preferably for about 1 to about 2 hours. This operation dimerizes the cyclopentadiene to dicyclopentadiene and allows for easy separation of the remaining $C_5$-hydrocarbons containing isoprene and piperylene from the higher boiling components by any suitable means, for example, by distillation at a temperature of from about 50° F (10° C) to about 122° F (50° C), preferably about 90° F (37° C) to about 115° F (46° C), and a pressure from about 0 to about 40 pounds per square inch gauge (about 0 to about 2 kilograms per square centimeter) preferably about 0 to about 20 pounds per square inch gauge (about 0 to about 1 kilogram per square centimeter), for about 0.5 to about 5 hours, preferably about 0.5 to about 2 hours.

It should be understood that some cyclopentadiene, dicyclopentadiene, dimers of isoprene and piperylene will be distilled over with the $C_5$-hydrocarbons. These compounds, however, do not significantly effect the properties of elastomers produced from the $C_5$-hydrocarbons.

The resulting $C_5$-hydrocarbon mixture will have a composition as defined in Table III below.

Table III

| Component | Weight Percent Broad Range | Preferred Range |
|---|---|---|
| Isoprene | 10 to 50 | 20 to 30 |
| Piperylene | 5 to 40 | 10 to 30 |
| Cyclopentadiene | 0 to 5 | 0 to 1 |
| $C_5$-paraffin | 10 to 50 | 10 to 30 |
| $C_5$-olefin | 10 to 50 | 10 to 30 |

The $C_5$-paraffin fraction above is primarily composed of normal pentane, isopentane and mixtures thereof. The $C_5$-olefin fraction consists of pentenes, methylbutenes and mixtures thereof.

Isoprene and piperylene monomers, in admixture with the $C_5$-paraffins and $C_5$-olefins are preferably copolymerized in the presence of a catalyst system. Any conventional catalyst system suitable for promoting a copolymerization reaction at elevated temperatures to obtain an elastomer can be employed in the present invention. More particularly, the mixture containing isoprene and piperylene monomers is placed in a reaction vessel and optionally a solvent, such as toluene, is added to the mixture. A preferred catalyst system for use herein comprises an iron complex, a trialkyl aluminum and a bidentate ligand capable of both pi and sigma bonding. Examples of such catalyst systems include an (A) iron complex selected from iron (III) acetylacetonate, iron (III) naphthenate, or iron octoate, (B) a trialkyl aluminum compound such as triethyl aluminum, triisopropyl aluminum and the like, and (C) a bidentate ligand such as 2-cyanopyridine, phenyl-2 pyridylacetonitrile, 2-pyridylaldoxime and the like which are added to the reaction vessel and the system is flushed with nitrogen. A typical catalyst system is selected from (i) iron (III) acetylacetonate, triethylaluminum, 2-cyanopyridine; (ii) iron (III) naphthenate, tributyl aluminum, 2-cyanopyridine; (iii) iron (III) octoacte, triethylaluminum, phenyl-2-pyridylacetonitrile. The catalyst system is added to the reaction vessel at a concentration of about 0.01 to about 10 weight percent, preferably about 0.1 to about 5 weight percent of the final $C_5$-hydrocarbon mixture. The polymerization of olefins and diolefins such as isoprene and piperylene is set forth in greater detail in U.S. Pat. 3,703,483, issued to Bozik et al., Nov. 21, 1972, for "Polymerization Process and Catalyst System Therefor", and U.S. Pat. 3,754,048, issued on Aug. 21, 1973 to Wu et al., for "Diene Polymerization", the disclosures of which are incorporated herein by reference. More particularly, the reaction mixture is reacted at a temperature of from about 14° F (−10° C) to about 212° F (100° C) at a pressure of from about 0 psi (0 kg./cm$^2$) to about 400 psi (28 kg./cm$^2$) for about 1 to 24 hours, preferably from about 77° F (25° C) to about 122° F (50° C) at a pressure of about 0 psi (0 kg./cm$^2$) to about 200 psi (14 kg./cm$^2$) for about 2 to about 6 hours. For example, in a particular preferred embodiment the reaction mixture is stirred at room temperature for 4 hours or until the copolymerization reaction is complete. The copolymer is next added to sufficient methyl alcohol containing enough hydrochloric acid to inactivate the catalyst. The copolymer is recovered using conventional methods, for example, filtration, and dried under vacuum at room temprature overnight.

It should be noted that isoprene and piperylene in the freeze mix will copolymerize at a much faster rate than the olefins in the mix due to the higher reactivity of the conjugated diolefins and the catalyst system used. The copolymer or elastomer will primarily be composed of isoprene and piperylene and contain a minor amount of other $C_5$-hydrocarbons which comprise 5 percent or less of the elastomer weight. The elastomer composition is exemplified by Table IV below.

Table IV

| Component | COPOLYMERIZED ELASTOMER Weight Percent Broad Range | Preferred Range |
|---|---|---|
| Isoprene | 20 to 90 | 50 to 80 |
| Piperylene | 5 to 60 | 20 to 50 |
| $C_5$-paraffin and $C_5$-olefin | 0 to 5 | 0 to 3 |

The elastomer produced herein, will primarily be composed of isoprene and piperylene and, in general, have a molecular weight greater than about 4000 with a preferred molecular weight range of from about 10,000 to about 1,000,000. The isoprene and piperylene are present in the copolymer composition at a molar ratio range of from about 10:1 to about 1:2 respectively, preferably from about 5:1 to about 1:1 respectively and comprise at least 95 percent by weight of the elastomer. As a result of removal of the cyclopentadiene from the hydrocarbon mixture prior to polymerization, improved polymer yields are obtained.

A critical aspect of the elastomers herein is tensile strength. As defined herein, tensile strength is the greatest longitudinal stress a substance can bear without being torn apart. The tensile strength of the elastomers were measured by casting about a 60 mil wet film of the elastomer on a teflon-coated foil using a 2 inch doctor blade. Free films of the elastomer were stripped off the foil after a two-day conditioning period. Specimens measuring ½ inch × 4 inches (1.27 cm × 10.16 cm) were cut from the films and the tensile strength was measured according to ASTM #D-412. The elastomers had high extensibility as indicated by an elongation above about 500 percent.

Viscosity is another physical measurement which serves to define and distinguish one particular substance from and/or over another substance. As defined herein, viscosity is the resistance to flow exhibited by a substance resulting from the combined effects of cohesion and adhesion. The unit of measurement is the poise and is defined as the viscosity of a hypothetical liquid (at a specified temperature) such that a force of one dyne per square centimeter causes two parallel liquid surfaces one square centimeter in area and one centimeter apart to move past one another at a rate of one centimeter per second. The standard test for viscosity is conducted according to the Saybolt Viscosity Test, ASTM D-88-56 (Reapproved 1968) the disclosure of which is incorporated herein by reference. The elastomers herein preferably have a viscosity range of from about 1,000 cps to about 50,000 cps at 75° F (23.9° C) when admixed at 20% (wt.) with toluene.

EXAMPLE IV

An elastomer was prepared from crude $C_5$-hydrocarbons obtained from an ethylene plant feed stream in the following manner. Crude $C_5$-hydrocarbons were separated from other undesirable by-products namely cyclopentadiene and dicyclopentadiene by steam-heating in an autoclave under a nitrogen atmosphere at 257° F (125° C) and a pressure of 300 pounds per square inch gauge (21 kilograms per square centimeter) for two hours to dimerize the cyclopentadiene. The $C_5$-hydrocarbons were next separated from the other components by vacuum distillation.

An elastomer was prepared by adding 300 ml of the treated $C_5$-hydrocarbon fraction, and a catalyst comprising 2.0 grams of phenyl-2-pyridylacetonitrile, 3.5 grams of iron III acetylacetonate, and 4.0 ml of triethylaluminum to a reaction vessel. The reaction mixture was stirred at room temperature for 4 hours. The catalyst was inactivated by adding 50 cc of methyl alcohol containing 5 cc of hydrochloric acid to the elastomer (e.g. a sufficient amount to inactivate the catalyst). The elastomer was recovered using conventional methods, for example, filtering the product from the other hydrocarbons, and dried under vacuum at room temperature overnight. The yield of elastomer recovered based on the amount of $C_5$-hydrocarbon present in the crude feed stream was 51%.

EXAMPLES V TO VII

Examples V to VII below serve to illustrate a feed stream composition from the crude stage (Example V) through the treated state (Example VI) and finally to the elastomer stage (Example VII). The $C_5$-hydrocarbons were separated from the other hydrocarbons according to the method of Example IV and the hydrocarbon compositions were analyzed before treatment, after treatment and after copolymerization using a Varian model 2800 Gas Liquid Chromatograph containing a column which was ¼ inch in diameter and 120 inches long. The column was packed with Celite and the apparatus was programmed to increase 7.2° F (4° C) every minute from 77° F) (25° C) to 302° F (150° C).

Table V

| GLC Analysis of Crude Feed Stream and Products (WT.%) | | | |
|---|---|---|---|
| | Example V (Crude $C_5$*) | Example VI (Pretreated $C_5$*) | Example VII Product of (Polymerization) |
| Paraffin + olefin | 32.2 | 33.7 | 33.7 |
| Isoprene | 29.4 | 22.3 | 2.3 |
| Piperylene | 16.5 | 13.8 | 8.1 |
| Cyclopentadiene | 8.9 | 0.13 | 0.15 |
| Aromatics | 7.0 | 17.6 | 17.6 |
| Dicyclopentadiene | 6.0 | 12.5 | 12.5 |
| Polymers[1] | 0 | 0 | 25.0 |
| Dienes + Polymers | 45.9 | 36.1 | 35.4 |

[1]wt. of dry polymer obtained from 100 cc of feed material
*$C_5$-hydrocarbons
The polymers above represent the weight percent of isoprene and piperlyene copolymerized from the feed stream. It should be noted that the copolymerization reaction does not proceed to completion and the weight percent of dienes + polymers is representative of both the unreacted and copolymerized isoprene and piperylene in the reaction.

EXAMPLES VIII TO XI $C_5$-hydrocarbons and selected amounts of cyclopentadiene were separated from undesirable by-products of a feed stream obtained from a commercial ethylene plant. The resulting mixtures were polymerized according to the procedure of Example IV. The results are summarized in Table VI below.

Table VI

| Polymerization of $C_5$-hydrocarbon[1](WT.%) | | | | |
|---|---|---|---|---|
| Examples | VIII | IX | X | XI |
| Isoprene | 29 | 29 | 29 | 29 |
| Piperylene | 7 | 16 | 16 | 16 |
| Cyclopentadiene | 9 | 0.29 | 0.13 | 0.13 |
| $C_5$-paraffin and $C_5$-olefin | 32 | 34 | 34 | 34 |
| Catalyst system[2] | — | — | — | — |
| Monomer/catalyst, | 200 | 200 | 200 | 100 |

Table VI-continued

| | Polymerization of C$_5$-hydrocarbon[1](WT.%) | | | |
|---|---|---|---|---|
| Examples | VIII | IX | X | XI |
| mole ratio | | | | |
| Polymer yield, based on C$_5$-diene | 4 | 45 | 51 | 69 |

[1]The feed stream was analyzed using the gas chromatograph disclosed in Table I.
[2]Catalyst system comprising 2.8 grams FE (AcAc)$_3$; 0.8 grams 2-cyano-pyridine and 3.2 ml triethyl aluminum at 77° F (25° C) for 24 hours.

The above data clearly show that by removing cyclopentadiene from the crude hydrocarbon mixture prior to polymerization increased yields of isoprene-piperylene copolymers are obtained.

Various modifications of the composition and method of the invention may be made without departing from the spirit and scope thereof and it is to be understood that the invention is to be limited only by the appended claims.

We claim:

1. In a process for preparing an elastomer comprising copolymerized C$_5$-hydrocarbons prepared from a hydrocarbon mixture containing C$_5$-monoolefinic hydrocarbons, C$_5$-diolefinic hydrocarbons C$_5$-paraffins, C$_6$-paraffins and benzene which comprises (A) heat-soaking said hydrocarbon mixture at a temperature sufficient to dimerize cyclopentadiene; (B) separating the resulting hydrocarbon mixture from the cyclopentadiene dimer; (C) copolymerizing the resulting hydrocarbon mixture in the presence of a catalyst which comprises an iron complex, a trialkyl aluminum and a bidentate ligand capable of both pi and sigma bonding to form an elastomer.

2. The process of claim 1 wherein said initial hydrocarbon mixture comprises:

| Component | Weight Percent |
|---|---|
| C$_5$-monoolefinic hydrocarbons | 5 to 50 |
| C$_5$-diolefinic hydrocarbons | 5 to 50 |
| C$_5$-paraffins | 5 to 75 |
| C$_6$-paraffins | 5 to 75 |
| Benzene | 5 to 75 |

3. The process of claim 1 wherein said initial hydrocarbon mixture comprises the following components in the following amounts:

| Component | Weight Percent |
|---|---|
| C$_5$-monoolefinic hydrocarbons | 10 to 30 |
| C$_5$-diolefinic hydrocarbons | 10 to 30 |
| C$_5$-paraffins | 20 to 40 |
| C$_6$-[aliphatics] paraffins | 5 to 40 |
| Benzene | 10 to 50 |

4. The process according to claim 1 wherein said heat-soaking is carried out at a temperature from about 50° C to about 300° C.

5. The process according to claim 1 wherein said heat-soaking is carried out at a temperature from about 110° C to about 150° C.

6. The process of claim 1 wherein said heat-soaking is carried out in an autoclave.

7. The process of claim 1 wherein said hydrocarbon mixture after heat-soaking comprises:

| Component | Weight Percent |
|---|---|
| Isoprene | 10 to 50 |
| Piperylene | 5 to 40 |
| Cyclopentadiene | 0 to 5 |
| C$_5$-paraffin | 10 to 50 |
| C$_5$-olefin | 10 to 50 |

8. The process according to claim 1 wherein said hydrocarbon mixture after heat-soaking comprises:

| Component | Weight Percent |
|---|---|
| Isoprene | 20 to 30 |
| Piperylene | 10 to 30 |
| Cyclopentadiene | 0 to 1 |
| C$_5$-paraffin | 10 to 30 |
| C$_5$-olefin | 10 to 30 |

9. The process of claim 1 wherein said catalyst is selected from (i) iron (III) acetylacetonate, triethylaluminum, 2-cyanopyridine; (ii) iron (III), naphthenate, tributylaluminum, 2-cyanopyridine; or (iii) iron (III) octoate, triethylaluminum, phenyl-2-pyridylacetonitrile.

10. The process of claim 1 wherein said catalyst comprises from about 0.1 to about 5.0 weight percent of the C$_5$-hydrocarbon mixture.

11. The process of claim 1 wherein said resulting hydrocarbon mixture is copolymerized at a temperature of about −10° C to about 100° C at a pressure of from about 0 kg./cm$^2$ to about 28 kg./cm$^2$ for about 1 to about 24 hours.

12. The process of claim 1 wherein said resulting hydrocarbon mixture is copolymerized at a temperature of about 25° C to about 50° C at a pressure of about 0 kg./cm$^2$ to 14 kg./cm$^2$ for about 2 to about 6 hours.

13. The process of claim 1 wherein said elastomer comprises:

| Component | Weight Percent |
|---|---|
| Isoprene | 20 to 90 |
| Piperylene | 5 to 60 |
| C$_5$-paraffin and C$_5$-olefin | 0 to 5 |

14. The process of claim 1 wherein said elastomer comprises:

| Component | Weight Percent |
|---|---|
| Isoprene | 50 to 80 |
| Piperylene | 20 to 50 |
| C$_5$-paraffin and C$_5$-olefin | 0 to 3 |

15. The process of claim 1 wherein the elastomer comprises at least 95 percent by weight of isoprene and piperylene.

16. The process of claim 1 wherein the elastomer comprises isoprene and piperylene in a molar ratio range of from about 10:1 to about 1:2 respectively.

17. The process according to claim 1 wherein the elastomer comprises isoprene and piperylene in a molar ratio range of from about 5:1 to about 1:1 respectively.

18. The process of claim 1 wherein the elastomer has a molecular weight range of from about 10,000 to about 1,000,000.

* * * * *